United States Patent
Nguyen et al.

(10) Patent No.: US 11,864,167 B2
(45) Date of Patent: Jan. 2, 2024

(54) CONCURRENT PHYSICAL SIDELINK FEEDBACK CHANNEL DETECTION

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Montgomery, NJ (US); Gabi Sarkis, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/948,797

(22) Filed: Oct. 1, 2020

(65) Prior Publication Data

US 2021/0105768 A1    Apr. 8, 2021

Related U.S. Application Data

(60) Provisional application No. 62/909,550, filed on Oct. 2, 2019.

(51) Int. Cl.
*H04W 72/04* (2023.01)
*H04W 72/0446* (2023.01)
(Continued)

(52) U.S. Cl.
CPC ....... *H04W 72/0446* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS

| | | | |
|---|---|---|---|
| 2021/0105728 A1* | 4/2021 | Nguyen | H04W 52/46 |
| 2022/0232520 A1* | 7/2022 | Yoshioka | H04L 1/1854 |
| 2022/0294570 A1* | 9/2022 | Hahn | H04W 72/0406 |

OTHER PUBLICATIONS

Interdigital., et al., "Physical Layer Procedures for NR V2X Sidelink", 3GPP Draft, 3GPP TSG RAN WG1 #98, R1-1909032, on Physical Layer Procedures for NR V2X Sidelink_Final, 3rd Generation Partnership Project (3GPP), Mobile Competence Centre, 650, Route Des Lucioles, F-06921 Sophia-Antipolis, vol. RAN WG1, No. Prague, CZ, Aug. 26, 2019-Aug. 30, 2019, Aug. 16, 2019 (Aug. 16, 2019), XP051765636, 12 Pages, Retrieved from the Internet: URL: http://www.3gpp.org/ftp/tsg_ran/WG1_RL1/TSGR1_98/Docs/R1-1909032.zip [retrieved on Aug. 16, 2019] Section 1, Section 2, p. 4, Case 2 p. 5, Case 3.

(Continued)

*Primary Examiner* — Willie J Daniel, Jr.
(74) *Attorney, Agent, or Firm* — Arun Swain

(57) ABSTRACT

Various aspects of the present disclosure generally relate to wireless communication. In some aspects, a user equipment (UE) may determine that a first quantity of physical sidelink feedback channel (PSFCH) transmissions to be transmitted in a slot fails to satisfy a condition that is based at least in part on a maximum quantity of PSFCH transmissions the UE can concurrently detect. The UE may identify, among the PSFCH transmissions to be transmitted in the slot, a subset of the PSFCH transmissions to be detected. For example, the subset of the PSFCH transmissions to be detected may include a second quantity of the PSFCH transmissions that satisfies the condition. Accordingly, the UE may monitor, during the slot, a PSFCH for the subset of the PSFCH transmissions. Numerous other aspects are provided.

30 Claims, 12 Drawing Sheets

(51) Int. Cl.
    *H04W 28/26* (2009.01)
    *H04L 1/1829* (2023.01)
    *H04W 72/51* (2023.01)
    *H04W 72/542* (2023.01)
    *H04W 56/00* (2009.01)

(52) U.S. Cl.
    CPC .......... *H04W 28/26* (2013.01); *H04W 72/51* (2023.01); *H04W 72/542* (2023.01); *H04W 56/0015* (2013.01)

(56) References Cited

OTHER PUBLICATIONS

International Search Report and Written Opinion—PCT/US2020/070607—ISA/EPO—dated Jan. 25, 2021.
NTT DOCOMO Inc, et al., "Sidelink Physical Layer Procedure for NR V2X", 3GPP Draft, 3GPP TSG RAN WG1 #98, R1-1909190_DCM_SL Phy Procedure_Fin, 3rd Generation Partnership Project (3GPP), Mobile Competence Centre, 650, Route Des Lucioles, F-06921 Sophia-Antipolls Cedex, France, vol. RAN WG1, No. Prague, CZ, Aug. 26, 2019-Aug. 30, 2019, Aug. 17, 2019 (Aug. 17, 2019), XP051765795, pp. 1-14, Retrieved from the Internet: URL:http://www.3gpp.org/ftp/tsg_ran/WG1_RL1/TSGR1_98/Docs/R1-1909190.zip [retrieved on Aug. 17, 2019] p. 3, Proposal 2 p. 4, Proposal 3 p. 7, Proposal 7.
OPPO: "Physical Layer Procedure for NR-V2X Sidelink", 3GPP Draft, 3GPP TSG RAN WG1 #98, R1-1908364 PHY Layer Procedure, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), XP051764972, 13 Pages, Retrieved from the Internet: URL: http://www.3gpp.org/ftp/tsg_ran/WG1_RL1/TSGR1_98/Docs/R1-1908364.zip, [retrieved on Aug. 16, 2019], Sections 1-6, p. 5, Paragraph 2.5 p. 6, Paragraphs 2.5-2.6.
VIVO: "Physical Layer Procedure for NR Sidelink", 3GPP Draft, (Draft) R1-1908154, 3GPP TSG RAN WG1 Meeting #98, Physical Layer Procedure for NR Side Link, 3rd Generation Partnership Project (3GPP), Mobile Competence Centre, 650, Route Des Lucioles, F-06921 Sophia-Antipolis cedex, vol. RAN WG1, No. Prague, CZ, Aug. 26, 2019-Aug. 30, 2019, Aug. 17, 2019 (Aug. 17, 2019), XP051764773, pp. 1-20, Retrieved from the Internet: URL: http://www.3gpp.org/ftp/tsg_ran/WG1_RL1/TSGR1_98/Docs/R1-1908154.zip [retrieved on Aug. 17, 2019] The Whole Document, p. 9, Paragraph 3.5 p. 5, Case 3.

\* cited by examiner

US 11,864,167 B2

CONCURRENT PHYSICAL SIDELINK FEEDBACK CHANNEL DETECTION

CROSS-REFERENCE TO RELATED APPLICATION

This Patent Application claims priority to U.S. Provisional Patent Application No. 62/909,550, filed on Oct. 2, 2019, entitled "CONCURRENT PHYSICAL SIDELINK FEEDBACK CHANNEL DETECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for concurrent physical sidelink feedback channel (PSFCH) detection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: determining that a first quantity of physical sidelink feedback channel (PSFCH) transmissions to be transmitted in a slot fails to satisfy a condition that is based at least in part on a maximum quantity of PSFCH transmissions the UE can concurrently detect; identifying, among the PSFCH transmissions to be transmitted in the slot, a subset of the PSFCH transmissions to be detected, wherein the identified subset includes a second quantity of the PSFCH transmissions that satisfies the condition; and monitoring, during the slot, a PSFCH for the subset of the PSFCH transmissions.

In some aspects, a UE for wireless communication may include memory and one or more processors operatively coupled to the memory. The memory and the one or more processors may be configured to: determine that a first quantity of PSFCH transmissions to be transmitted in a slot fails to satisfy a condition that is based at least in part on a maximum quantity of PSFCH transmissions the UE can concurrently detect; identify, among the PSFCH transmissions to be transmitted in the slot, a subset of the PSFCH transmissions to be detected, wherein the identified subset includes a second quantity of the PSFCH transmissions that satisfies the condition; and monitor, during the slot, a PSFCH for the subset of the PSFCH transmissions.

In some aspects, a non-transitory computer-readable medium may store one or more instructions for wireless communication. The one or more instructions, when executed by one or more processors of a UE, may cause the one or more processors to: determine that a first quantity of PSFCH transmissions to be transmitted in a slot fails to satisfy a condition that is based at least in part on a maximum quantity of PSFCH transmissions the UE can concurrently detect; identify, among the PSFCH transmissions to be transmitted in the slot, a subset of the PSFCH transmissions to be detected, wherein the identified subset includes a second quantity of the PSFCH transmissions that satisfies the condition; and monitor, during the slot, a PSFCH for the subset of the PSFCH transmissions.

In some aspects, an apparatus for wireless communication may include: means for determining that a first quantity of PSFCH transmissions to be transmitted in a slot fails to satisfy a condition that is based at least in part on a maximum quantity of PSFCH transmissions the apparatus can concurrently detect; means for identifying, among the PSFCH transmissions to be transmitted in the slot, a subset of the PSFCH transmissions to be detected, wherein the identified subset includes a second quantity of the PSFCH transmissions that satisfies the condition; and means for monitoring, during the slot, a PSFCH for the subset of the PSFCH transmissions.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
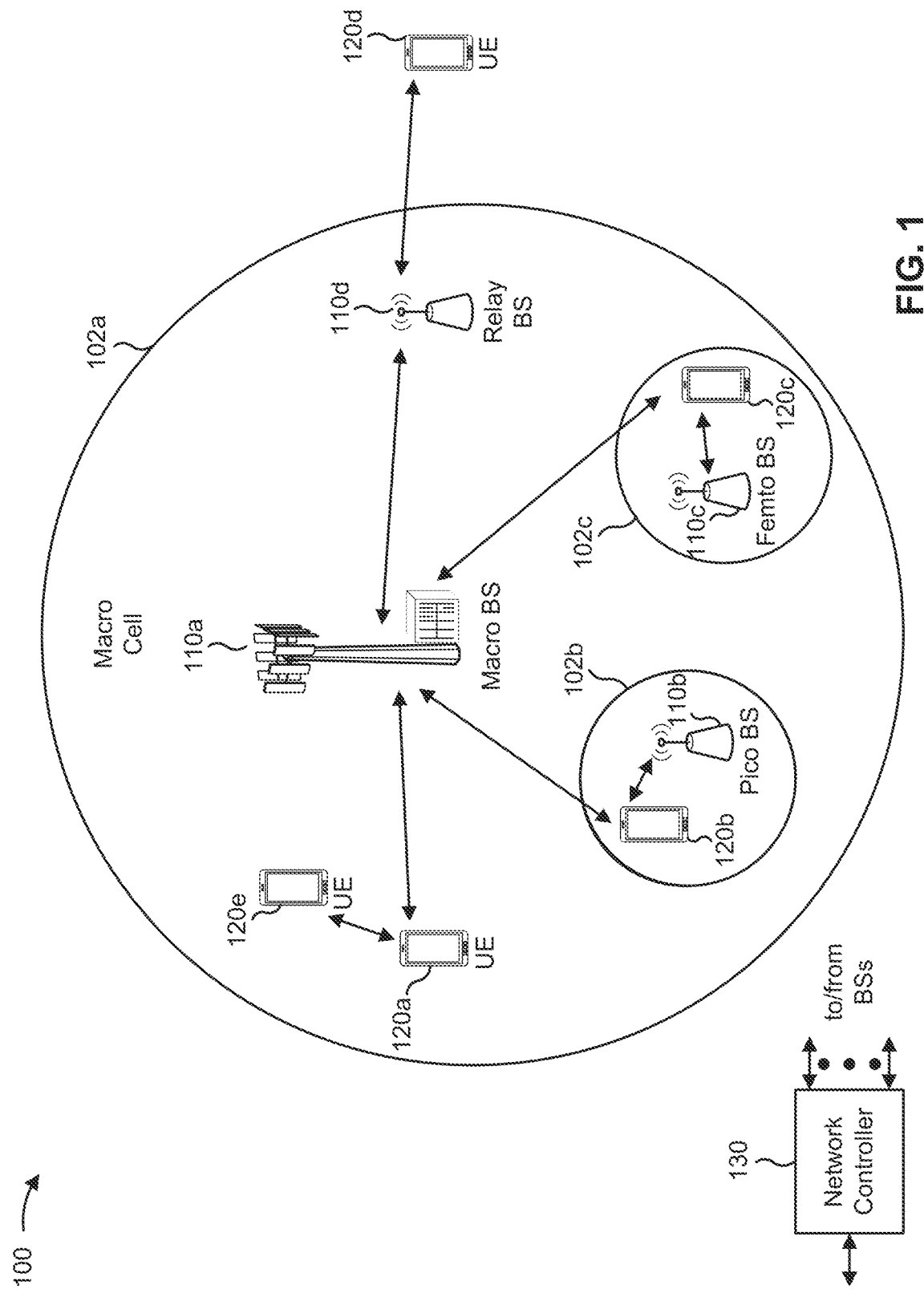
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
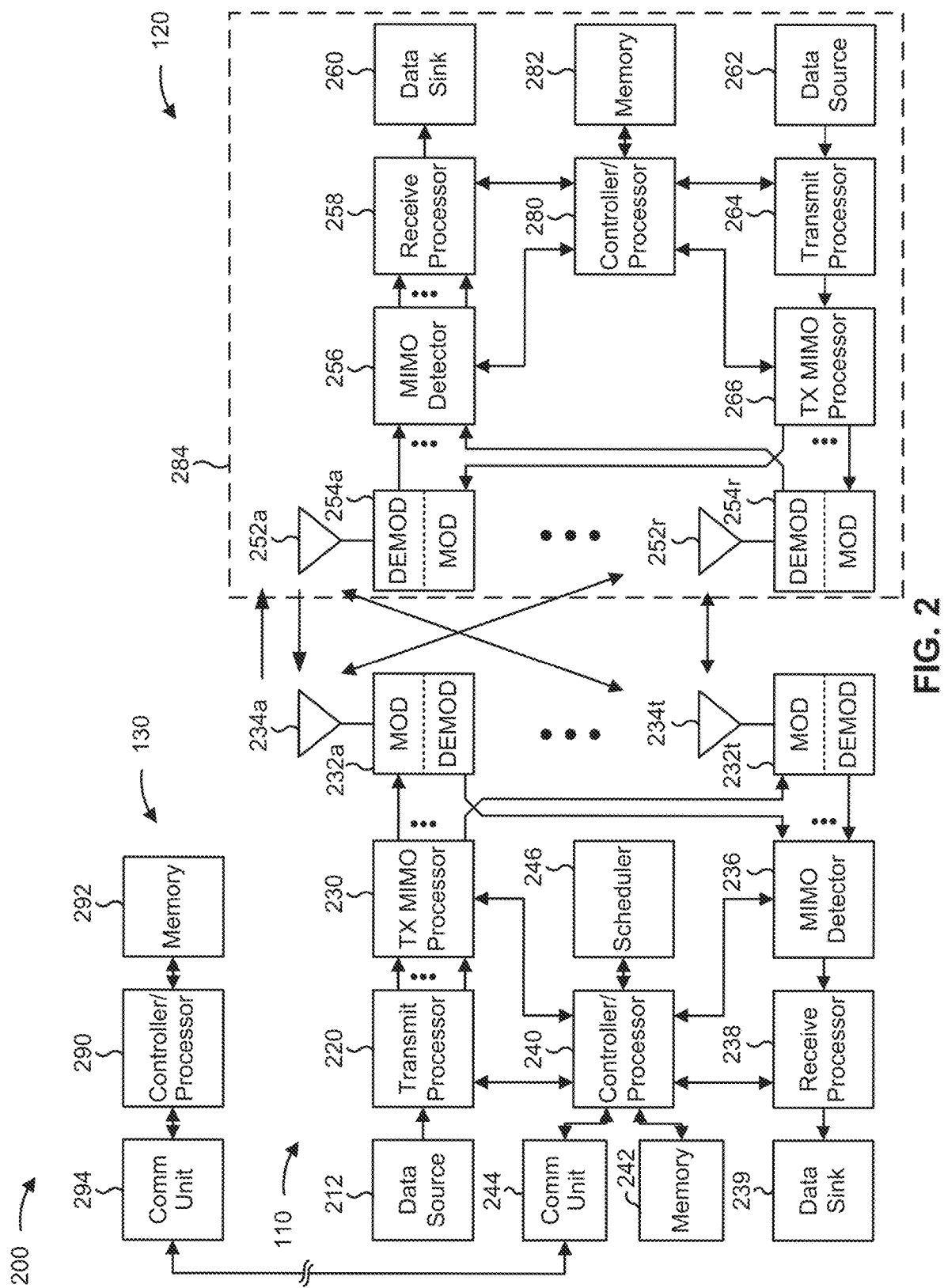
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with concurrent physical sidelink feedback channel (PSFCH) detection, as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 900 of FIG. 9 and/or other processes as described herein. In some aspects, executing instructions may include running the instructions, converting the instructions, compiling the instructions, interpreting the instructions, and/or the like.

In some aspects, UE 120 may include means for determining that a first quantity of PSFCH transmissions to be transmitted in a slot fails to satisfy a condition that is based at least in part on a maximum quantity of PSFCH transmissions the UE can concurrently detect, means for identifying, among the PSFCH transmissions to be transmitted in the slot, a subset of the PSFCH transmissions to be detected, wherein the identified subset includes a second quantity of the PSFCH transmissions that satisfies the condition, means for monitoring, during the slot, a PSFCH for the subset of the PSFCH transmissions, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
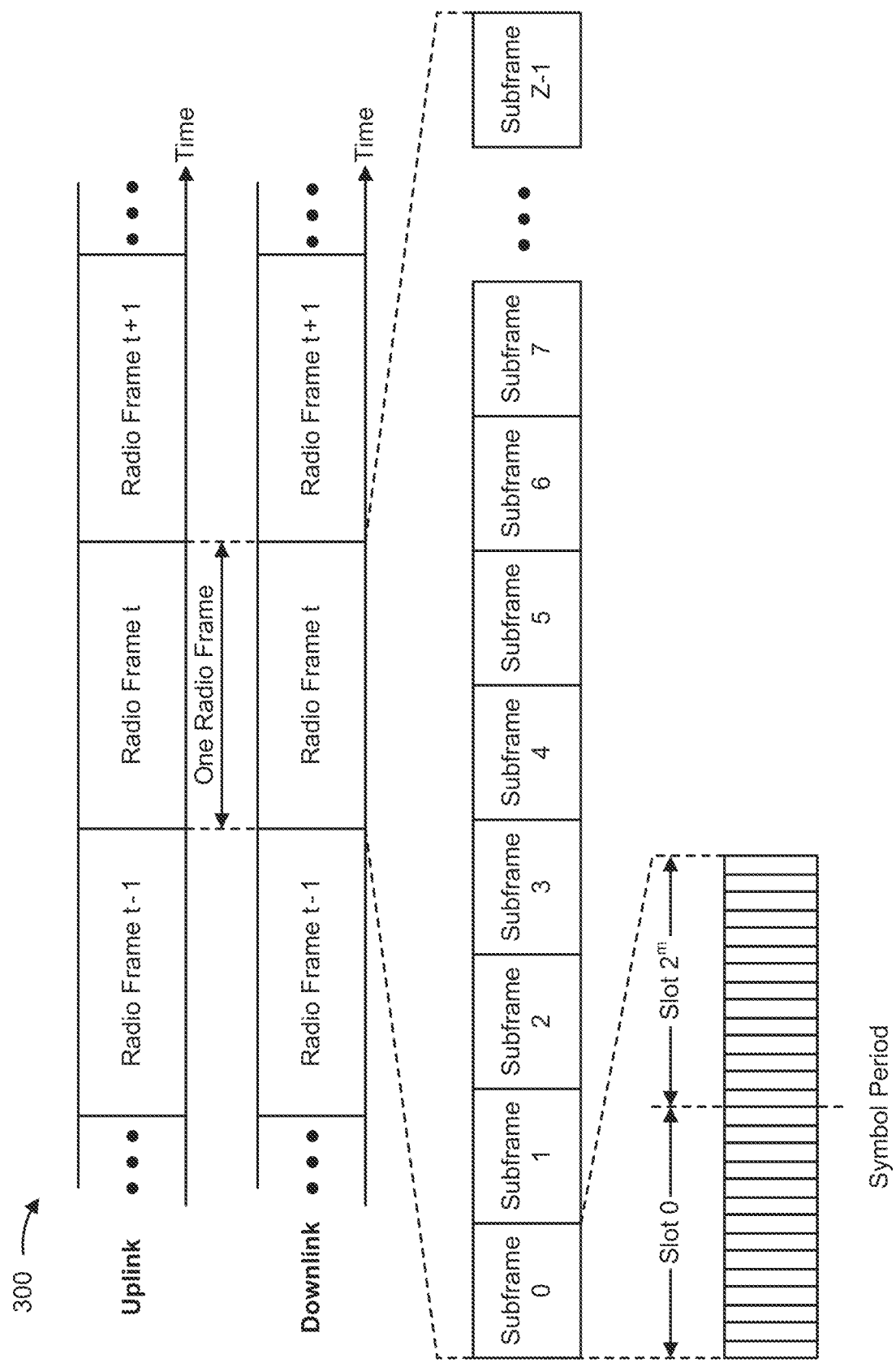
FIG. 3A is a diagram illustrating an example frame structure in a wireless network, in accordance with various aspects of the present disclosure.

FIG. 3A is a diagram illustrating an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
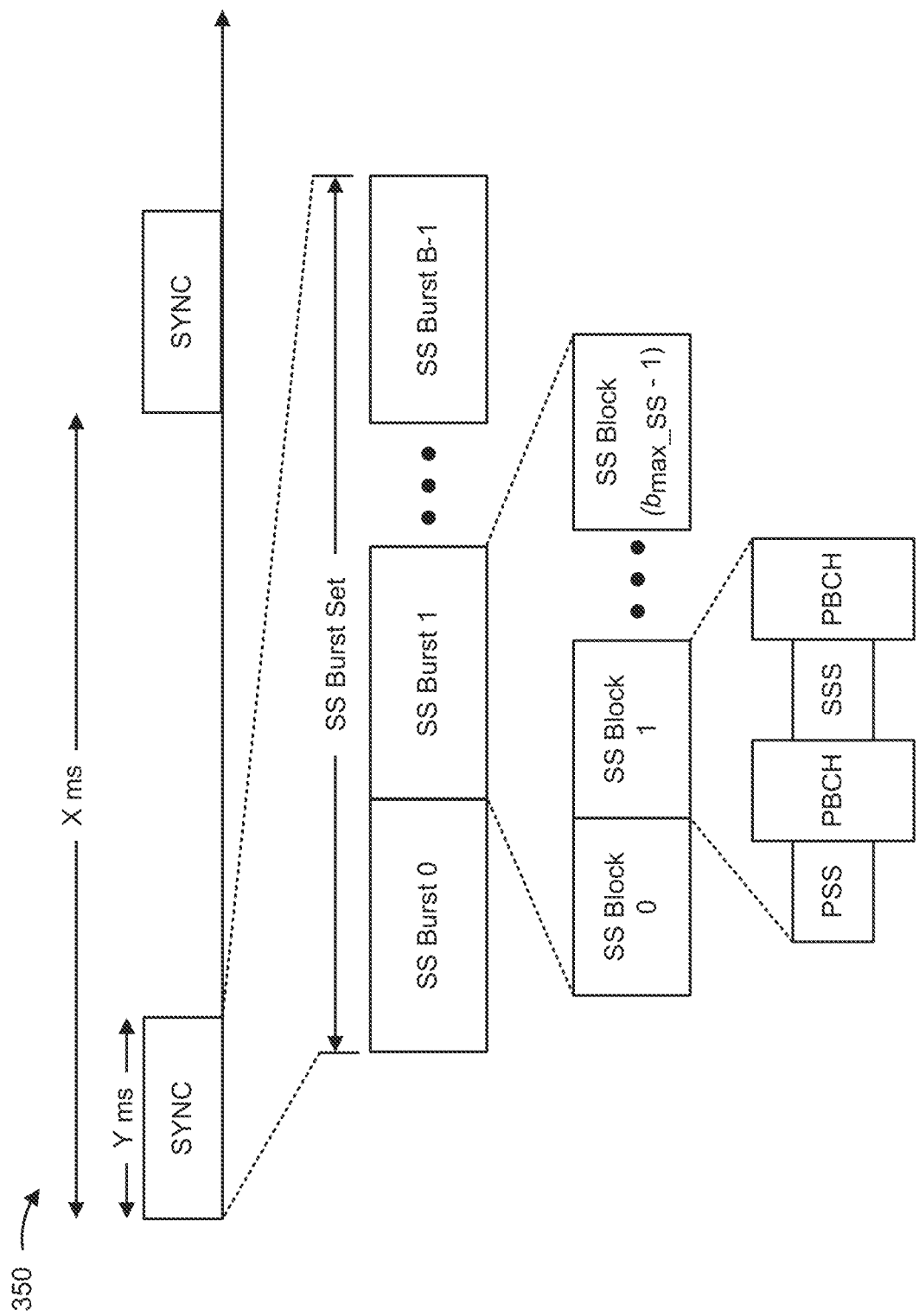
FIG. 3B is a diagram illustrating an example synchronization communication hierarchy in a wireless network, in accordance with various aspects of the present disclosure.

FIG. 3B is a diagram illustrating an example SS hierarchy 350, which is an example of a synchronization communication hierarchy. As shown in FIG. 3B, the SS hierarchy 350 may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
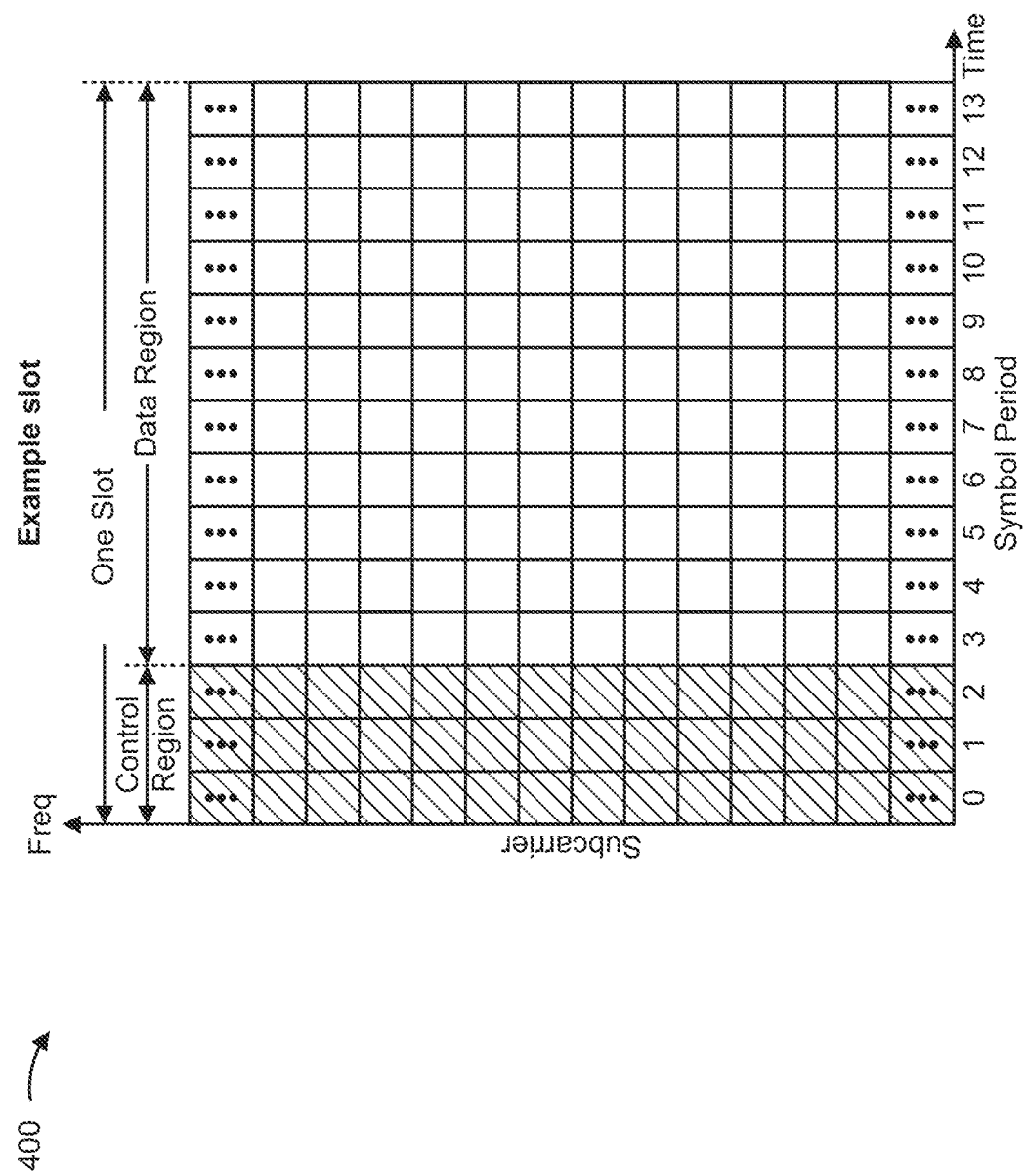
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communication (URLLC) service.

In some aspects, a single component carrier bandwidth of 100 MHz may be supported. NR resource blocks may span 12 subcarriers with a subcarrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
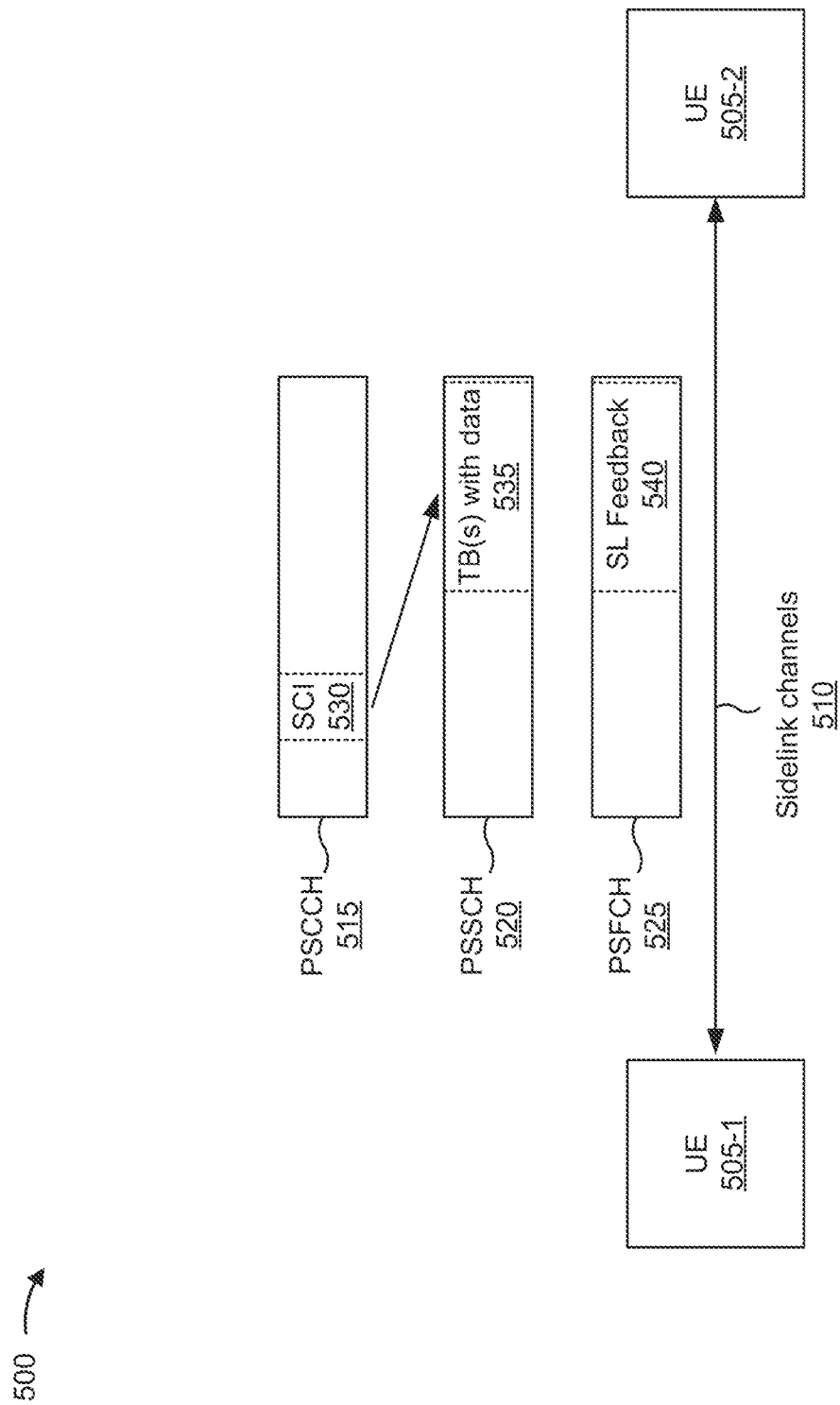
FIG. 5 is a diagram illustrating an example of sidelink communications, in accordance with various aspects of the present disclosure.

FIG. 5 is a diagram illustrating an example 500 of sidelink communications, in accordance with various aspects of the present disclosure.

As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for P2P communications, D2D communications, V2X communications (e.g., which may include V2V communications, V2I communications, V2P communications, and/or the like), mesh networking, and/or the like. In some aspects, the UEs 505 (e.g., UE 505-1 and/or UE 505-2) may correspond to one or more other UEs described elsewhere herein, such as UE 120. In some aspects, the one or more sidelink channels 510 may use a PC5 interface and/or may operate in a high frequency band (e.g., the 5.9 GHz band). Additionally, or alternatively, the UEs 505 may synchronize timing of transmission time intervals (TTIs) (e.g., frames, subframes, slots, symbols, and/or the like) using global navigation satellite system (GNSS) timing.

As further shown in FIG. 5, the one or more sidelink channels 510 may include a physical sidelink control channel (PSCCH) 515, a physical sidelink shared channel (PSSCH) 520, and/or a PSFCH 525. The PSCCH 515 may be used to communicate control information, similar to a PDCCH and/or a physical uplink control channel (PUCCH) used for cellular communications with a base station 110 via an access link or an access channel. The PSSCH 520 may be used to communicate data, similar to a PDSCH and/or a physical uplink shared channel (PUSCH) used for cellular communications with a base station 110 via an access link or an access channel. For example, the PSCCH 515 may carry sidelink control information (SCI) 530, which may indicate various control information used for sidelink communications, such as one or more resources (e.g., time resources, frequency resources, spatial resources, and/or the like) where a transport block (TB) 535 may be carried on the PSSCH 520. The TB 535 may include data. The PSFCH 525 may be used to communicate sidelink feedback 540, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 510 may use resource pools. For example, a scheduling assignment (e.g., included in SCI 530) may be transmitted in sub-channels using specific resource blocks (RBs) across time. In some aspects, data transmissions (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 505 may operate using a transmission mode where resource selection and/or scheduling is performed by the UE 505 (e.g., rather than a base station 110). In some aspects, the UE 505 may perform resource selection and/or scheduling by sensing channel availability for transmissions. For example, the UE 505 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 505 may perform resource selection and/or scheduling using SCI 530 received in the PSCCH 515, which may indicate occupied resources, channel parameters, and/or the like. Additionally, or alternatively, the UE 505 may perform resource selection and/or scheduling by determining a channel busy rate (CBR) associated with various sidelink channels, which may be used for rate control (e.g., by indicating a maximum number of resource blocks that the UE 505 can use for a particular set of subframes).

In the transmission mode where resource selection and/or scheduling is performed by a UE 505, the UE 505 may generate sidelink grants, and may transmit the grants in SCI 530. A sidelink grant may indicate, for example, one or more parameters (e.g., transmission parameters) to be used for an upcoming sidelink transmission, such as one or more resource blocks to be used for the upcoming sidelink transmission on the PSSCH 520 (e.g., for TBs 535), one or more subframes to be used for the upcoming sidelink transmission, a modulation and coding scheme (MCS) to be used for the upcoming sidelink transmission, and/or the like. In some aspects, a UE 505 may generate a sidelink grant that indicates one or more parameters for semi-persistent scheduling (SPS), such as a periodicity of a sidelink transmission. Additionally, or alternatively, the UE 505 may generate a sidelink grant for event-driven scheduling, such as for an on-demand sidelink message.

As indicated above, FIG. 5 is provided as an example. Other examples may differ from what is described with respect to FIG. 5.

Figure 6:
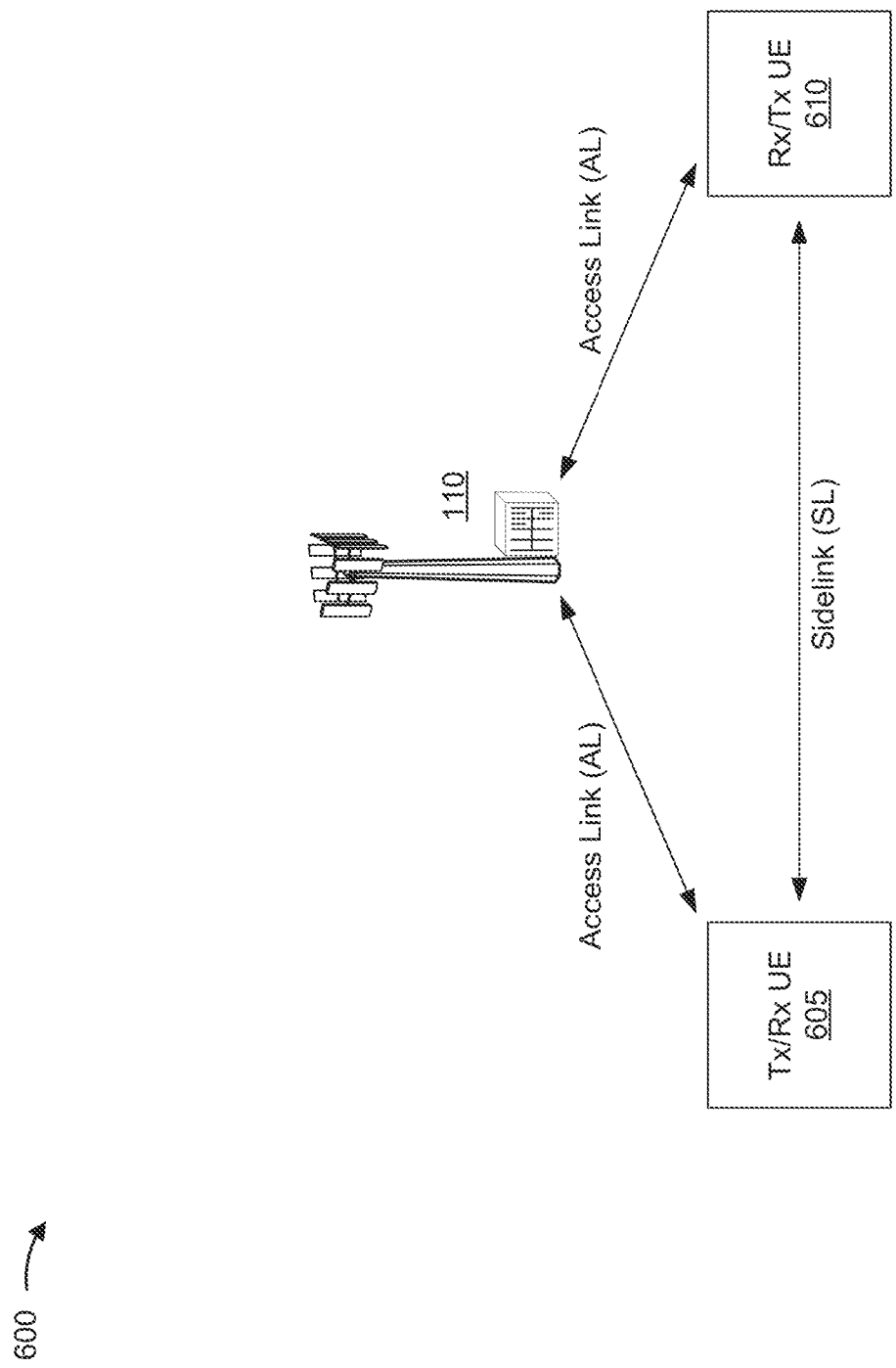
FIG. 6 is a diagram illustrating an example of sidelink communications and access link communications, in accordance with various aspects of the present disclosure.

FIG. 6 is a diagram illustrating an example 600 of sidelink communications and access link communications, in accordance with various aspects of the present disclosure.

As shown in FIG. 6, a transmitter (Tx)/receiver (Rx) UE 605 and an Rx/Tx UE 610 may communicate with one another via a sidelink, as described above in connection with FIG. 5. As further shown, in some sidelink modes, a base station 110 may communicate with the Tx/Rx UE 605 via a first access link. Additionally, or alternatively, in some sidelink modes, the base station 110 may communicate with the Rx/Tx UE 610 via a second access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 6 is provided as an example. Other examples may differ from what is described with respect to FIG. 6.

Figure 7:
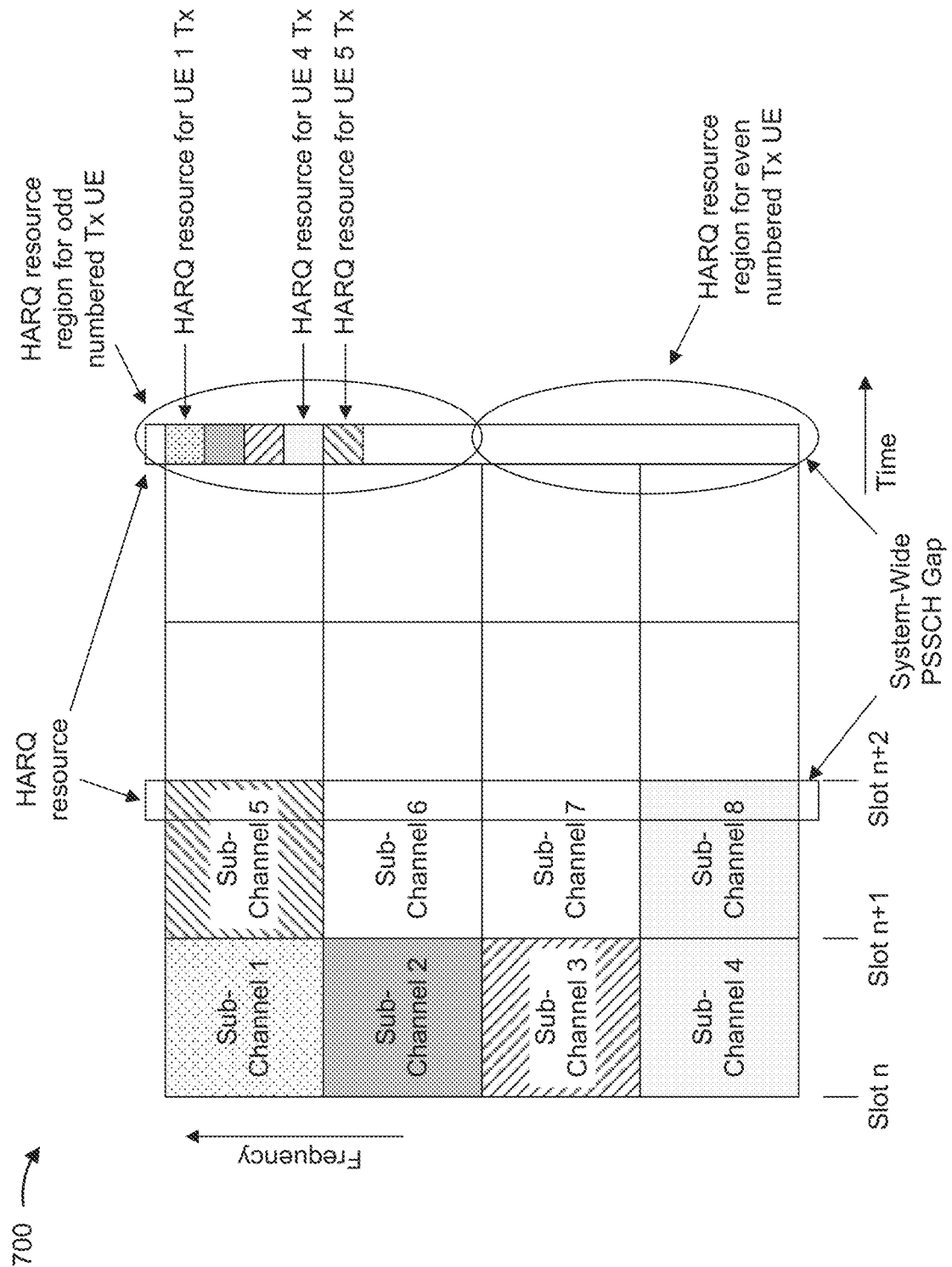
FIG. 7 is a diagram illustrating an example hybrid automatic repeat request (HARQ) resource configuration for sidelink communications, in accordance with various aspects of the present disclosure.

FIG. 7 is a diagram illustrating an example HARQ resource configuration 700 for sidelink communications, in accordance with various aspects of the present disclosure.

As described above, in some circumstances, two or more subordinate entities (e.g., UEs) may communicate with each other using sidelink signals. Real-world applications of such sidelink communications may include public safety, proximity services, UE-to-network relaying, V2X communications, Internet of Everything (IoE) communications, IoT communications, mission-critical mesh, and/or various other suitable applications. Generally, a sidelink signal may refer to a signal communicated from one subordinate entity (e.g., a first UE) to another subordinate entity (e.g., a second UE) without relaying the signal through the scheduling entity (e.g., UE or BS), even though the scheduling entity may be utilized for scheduling and/or control purposes. In some aspects, the sidelink signals may be communicated using a licensed frequency spectrum, an unlicensed frequency spectrum (e.g., an industrial, scientific, and medical (ISM) radio band, such as 5 GHz, which is reserved for purposes other than cellular communication such as wireless local area network communication), and/or the like.

As shown in the example HARQ resource configuration 700 in FIG. 7, a HARQ feedback occasion may include a time-domain duration (e.g., one or more symbols) and a plurality of frequency-domain resources (e.g., a plurality of sub-channels) that are reserved for HARQ feedback on the sidelink. For example, the HARQ feedback may include an acknowledgment (ACK) to indicate that a UE successfully received a sidelink communication, a negative acknowledgement (NACK) to indicate that the UE failed to receive the sidelink communication, and/or the like. In some aspects, the frame structure of the sidelink may include a plurality of HARQ feedback occasions, and a time between the HARQ feedback occasions may define a system-wide PSSCH gap. The plurality of HARQ feedback occasions may be periodic (e.g., may occur at a particular time interval), may be configured at particular time-domain locations, and/or the like. In some aspects, a HARQ feedback occasion may be a multi-slot HARQ feedback occasion, in that the HARQ feedback occasion may be used to aggregate HARQ feedback for sidelink communications that were transmitted in a plurality of sub-channels and a plurality of slots that occurred prior to the HARQ feedback occasion.

As further shown in FIG. 7, the frequency-domain resources in each HARQ feedback occasion may be partitioned into different HARQ resource regions, each of which may include various subcarriers that correspond to HARQ resources that one or more UEs can use to transmit HARQ feedback. As an example, in FIG. 7, the frequency-domain resources in the HARQ feedback occasion may include a first HARQ resource region for odd-numbered transmitting UEs and a second HARQ resource region for even-numbered transmitting UEs (e.g., based on respective identifiers associated with the UEs). In some aspects, a UE may generally receive a HARQ configuration (e.g., from another UE, a base station in a wireless network, and/or the like) that identifies a HARQ resource to be used to transmit HARQ feedback, may be hard-coded with the HARQ configuration (e.g., the HARQ configuration may be stored on a UE prior to deployment in a wireless network), and/or the like. Accordingly, a UE may identify a HARQ resource (e.g., a subcarrier), in the HARQ feedback occasion, for transmitting HARQ feedback for a sidelink communication based at least in part on a time-domain resource (e.g., a slot) and a frequency-domain resource (e.g., a sub-channel) in which the sidelink communication was received.

Accordingly, a UE may provide, to another UE, feedback associated with a sidelink communication transmitted by the other UE on a sidelink between the UE and the other UE. The feedback may include, for example, HARQ feedback (e.g., an ACK to indicate that the UE successfully received the sidelink communication, a NACK to indicate that the UE failed to receive the sidelink communication, and/or the like). The UE may transmit the HARQ feedback in one or more PSFCH transmissions on the sidelink. In some cases, as shown in FIG. 7, the sidelink may include a frame structure in which one or more HARQ feedback occasions may be used for transmitting the one or more PSFCH transmissions. Unlike a cellular communication link with a base station, where the UE may provide HARQ feedback to a single base station, multiple UEs may provide HARQ feedback on a sidelink in a single HARQ feedback occasion.

Accordingly, in some cases, a UE may be configured to continuously monitor PSFCH transmissions that include HARQ feedback from multiple UEs, which may include one or more UEs that are providing HARQ feedback for one or more previous sidelink transmissions sent by the UE. Additionally, or alternatively, the multiple UEs providing the HARQ feedback may include one or more UEs that are providing the HARQ feedback for previous sidelink transmissions sent by other UEs. For example, when a UE transmits a packet on a sidelink, the UE may reserve one or more resources for retransmission of the packet (e.g., in case the UE receives a PSFCH transmission that includes a NACK for the initial packet transmission, fails to receive a PSFCH transmission that includes an ACK for the initial packet transmission, and/or the like). Accordingly, in some cases, a UE may monitor PSFCH transmissions that include HARQ feedback intended for other UEs in order to determine whether the reserved resources are available for use (e.g., other UEs may be permitted to use the reserved resources if the original reserving UE is not using the reservation, such as when the HARQ feedback includes an ACK to indicate that a packet was successfully received). However, in some cases, a UE may have an ability to only detect up to a maximum quantity of concurrent PSFCH transmissions in a single slot (e.g., due to a UE capability, a UE complexity limitation, and/or the like). Accordingly, if a quantity of PSFCH transmissions scheduled in a slot exceeds the maximum quantity of concurrent PSFCH transmissions that the UE can detect in a single slot, the UE may be unable to determine which PSFCH transmissions to monitor, which PSFCH transmissions to ignore in the slot, how to handle undetected PSFCH transmissions, and/or the like.

Some aspects described herein relate to techniques and apparatuses for concurrent PSFCH detection. For example, when a quantity of PSFCH transmissions scheduled for transmission in a particular slot fails to satisfy a condition that is based at least in part on a maximum quantity of PSFCH transmissions the UE can concurrently detect (e.g., the quantity of scheduled PSFCH transmissions exceeds the maximum quantity of PSFCH transmissions the UE can concurrently detect), the UE may identify a subset of the PSFCH transmissions to be detected in the slot using techniques described in further detail herein. For example, in some aspects, the subset of the PSFCH transmissions to be detected may include a quantity of PSFCH transmissions that satisfies the condition related to the maximum quantity of PSFCH transmissions the UE can concurrently detect (e.g., is less than or equal to the maximum quantity of PSFCH transmissions the UE can concurrently detect). Furthermore, the subset of the PSFCH transmissions to be detected may be identified according to various criteria, such as a priority of a resource reservation associated with the PSFCH transmission, a distance to an intended receiver of a PSFCH transmission, an RSRP measurement associated with a received packet in which another UE indicates that a resource has been reserved for retransmission, and/or the like.

Accordingly, the UE may monitor a PSFCH for the identified subset of the PSFCH transmissions during the slot, which may indicate whether a previous packet is to be retransmitted, whether a resource reserved by another UE will be used for a retransmission or is available for use, and/or the like. Furthermore, as described herein, the UE may implement various rules to handle other PSFCH transmissions that are excluded from the subset of the PSFCH transmissions to be monitored. For example, the UE may either assume that a PSFCH transmission will or will not be sent based at least in part on various criteria, and the assumption can be used to infer whether a transmission resource reserved by another UE is available. In this way, the UE may detect HARQ feedback for multiple sidelink communications in a single slot in a manner that allows the UE to determine whether a previous sidelink communication is to be retransmitted, whether transmission resources reserved for retransmission by other UEs are available to use, and/or the like.

Figure 8A:
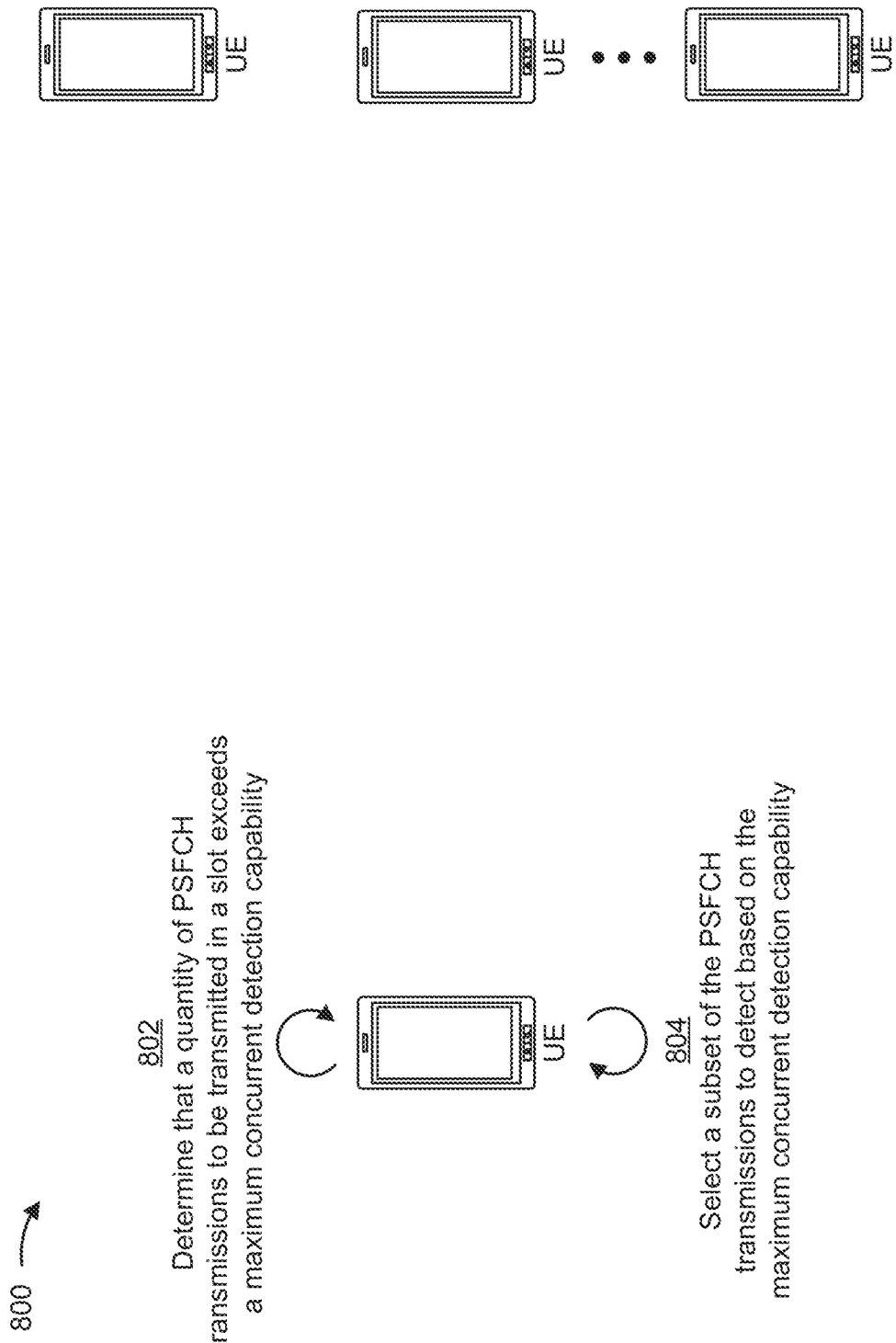
FIGS. 8A-8B are diagrams illustrating an example implementation of concurrent physical sidelink feedback channel (PSFCH) detection, in accordance with various aspects of the present disclosure.
Figure 8B:
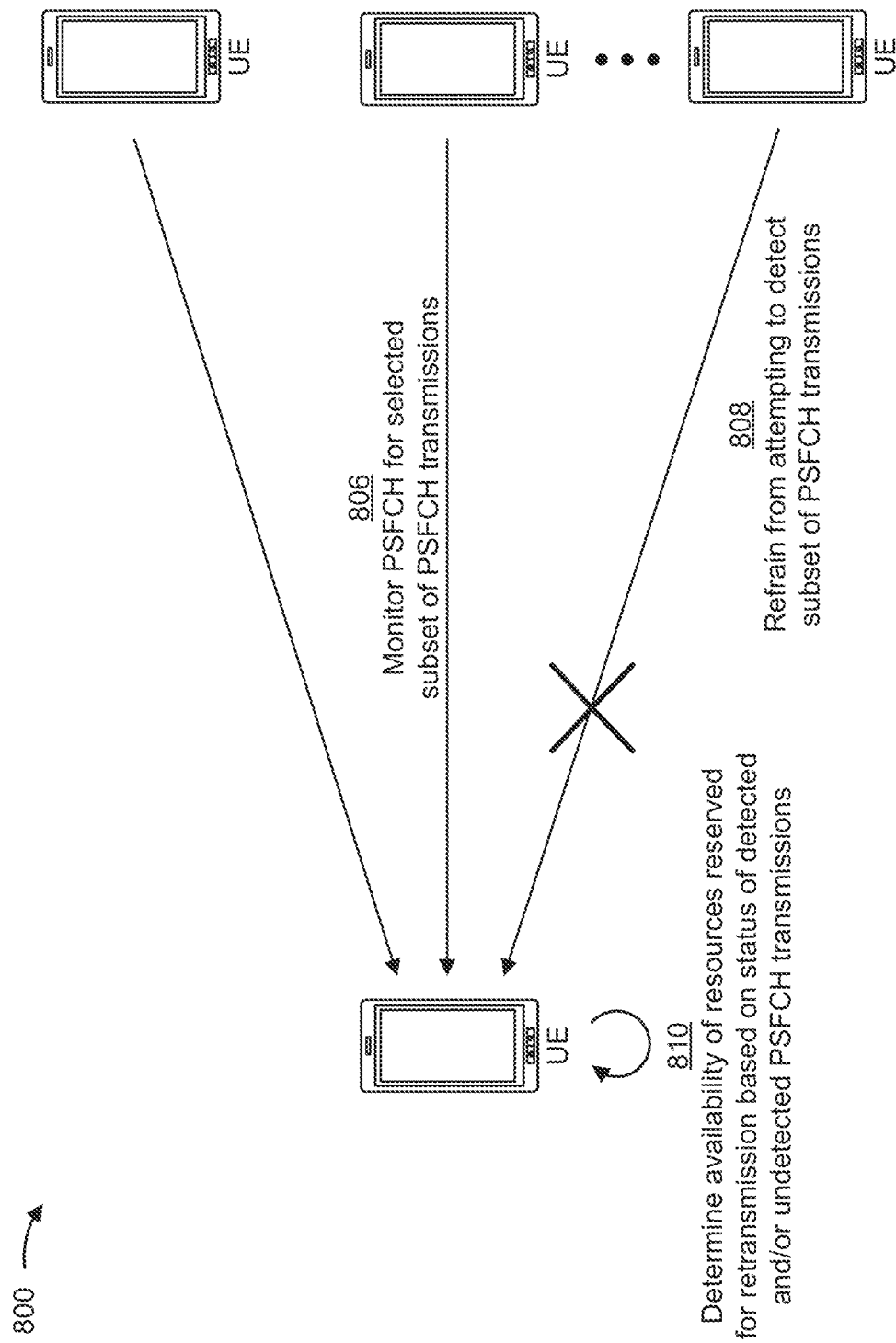

FIGS. 8A-8B are diagrams illustrating an example implementation 800 of concurrent PSFCH detection, in accordance with various aspects of the present disclosure. As shown in FIGS. 8A-8B, example implementation 800 may include a plurality of UEs (e.g., UEs 120a, 120e, 505-1, 505-2, 605, 610, and/or the like) communicating over a sidelink. In the illustrated example, a particular UE may have transmitted one or more sidelink communications to one or more other UEs and may be monitoring a PSFCH for one or more PSFCH transmissions that include HARQ feedback to indicate whether the one or more sidelink communications are to be retransmitted (e.g., based at least in part on the HARQ feedback including a NACK for the previous sidelink communications). Additionally, or alternatively, the particular UE may have data to transmit, and may be monitoring the PSFCH to determine whether one or more resources that other UEs have reserved for a retransmission of a previous sidelink communication will be used by the other UEs (e.g., if the HARQ feedback includes a NACK for the previous sidelink communications) or whether the one or more reserved resources are available for the UE to use (e.g., if the HARQ feedback includes an ACK for the previous sidelink communications or if no HARQ feedback is provided).

In the following description, the other UEs that reserve resources for retransmission and/or send the PSFCH transmissions including the HARQ feedback may be referred to as "other UEs," and the particular UE that monitors the PSFCH for PSFCH transmissions and determines a subset of PSFCH transmissions to be monitored in a next HARQ feedback slot may be generally referred to as "the UE." Furthermore, although the example implementation 800 illustrated in FIGS. 8A-8B includes three (3) other UEs that send PSFCH transmissions including HARQ feedback, in some aspects, a greater or lesser quantity of other UEs may send the HARQ feedback. In general, the UE and the other UEs may be included in a wireless network (e.g., wireless network 100) and may communicate via a sidelink. In some aspects, the sidelink may be configured with a frame structure, such as the frame structure 300 illustrated in FIG. 3A, a HARQ resource configuration, such as the HARQ resource configuration 700 illustrated in FIG. 7, and/or the like.

In some aspects, the UE and the other UEs may communicate via the sidelink by transmitting and/or receiving sidelink communications via the sidelink. For example, the UE may receive a plurality of sidelink communications on the sidelink from the other UEs, each of which may transmit one or more sidelink communications to the UE. In some aspects, the sidelink communications may be transmitted and received via a PSCCH, a PSSCH, a PSFCH, and/or the like. In some aspects, the plurality of sidelink communications may be transmitted on one or more channels or sub-channels of the sidelink. In this case, each sidelink communication may be transmitted in one or more time-domain resources (e.g., across one or more slots, across one or more symbols, and/or the like) and/or in one or more frequency-domain resources (e.g., in a sub-channel of the frequency bandwidth of the sidelink). In some aspects, a sub-channel may include a plurality of subcarriers of the frequency bandwidth sidelink, one or more resource blocks (RBs) of the frequency bandwidth of the sidelink, and/or the like.

In some aspects, the UE and the other UEs may communicate using an ACK/NACK HARQ feedback configuration, in which a receiver UE (e.g., the UE) is to transmit an ACK based at least in part on successfully receiving and decoding a sidelink communication from a transmitter UE (e.g., another UE), and is to transmit a NACK for a sidelink communication that the receiver UE is unable to decode. In some aspects, the UE and the other UEs may communicate using a NACK-only HARQ feedback configuration, in which a receiver UE does not transmit HARQ feedback for sidelink communications that are successfully received and decoded, and only transmits a NACK for sidelink communications that the receiver UE is unable to decode. In some aspects, when a UE receives a NACK for a sidelink communication that a receiver UE was unable to decode, the UE may retransmit the sidelink communication using a previously reserved resource. Otherwise, if the UE receives an ACK indicating that the receiver UE was able to decode the sidelink communication or does not receive a PSFCH transmission that includes HARQ feedback, the UE may refrain from retransmitting the sidelink communication using the previously reserved resource. In this case, the previously reserved resource may be available for use by other UEs.

Accordingly, in some aspects, a UE may be configured with a parameter that indicates a maximum quantity of PSFCH transmissions that the UE is able to concurrently detect in a single slot (e.g., a slot associated with a HARQ feedback occasion). For example, in some aspects, the parameter that indicates the maximum quantity of PSFCH transmissions that the UE is able to concurrently detect may be signaled to and/or configured by a base station and/or another component in the wireless network based at least in part on a concurrent detection capability of the UE, a configured limit, and/or the like. Accordingly, in some aspects, the UE may generally detect up to the maximum quantity of PSFCH transmissions in a given slot associated with a HARQ feedback occasion. However, as mentioned above, in some cases a quantity of PSFCH transmissions that are scheduled in a slot may exceed the maximum quantity of PSFCH transmissions that the UE is able to concurrently detect.

For example, as shown in FIG. 8A, and by reference number 802, the UE may determine that a quantity of PSFCH transmissions to be transmitted in a next slot exceeds a maximum concurrent detection capability of the UE, where each PSFCH transmission may include HARQ feedback for a previous sidelink communication. For example, in some aspects, the HARQ feedback for a particular sidelink communication may include an ACK to indicate, to a transmitter of the sidelink communication (e.g., the UE or another UE), that the sidelink communication was successfully received and decoded. Additionally, or alternatively, the HARQ feedback may include a NACK to indicate, to the transmitter of the sidelink communication, that the sidelink communication was not successfully received and/or decoded. In some aspects, the HARQ feedback included in a particular PSFCH transmission may be an ACK if the receiving UE is capable of decoding both control information (e.g., SCI) included in the sidelink communication and corresponding data (e.g., a payload) of the sidelink communication. In some aspects, the HARQ feedback included in a particular PSFCH transmission may be a NACK if the receiving UE fails to successfully decode the control information included in the sidelink communication and/or the corresponding data of the sidelink communication.

As further shown in FIG. 8A, and by reference number 804, the UE may select, among the quantity of PSFCH transmissions to be transmitted in the next slot, a subset of the PSFCH transmissions that are to be detected. For example, in some aspects, the subset of the PSFCH transmissions may generally include a quantity of the PSFCH transmissions that satisfies the maximum concurrent detection capability of the UE (e.g., is less than or equal to the maximum quantity of PSFCH transmissions that the UE is able to concurrently detect in a single slot). In some aspects, as described herein, the UE may apply one or more criteria to determine which of the PSFCH transmissions to be transmitted in the next slot are to be included in and/or excluded from the subset of the PSFCH transmissions that are to be detected. For example, as described herein, the criteria that the UE applies to the PSFCH transmissions to be transmitted in the next slot may relate to reservation priorities, distances to intended receivers of the PSFCH transmission (which may be the UE itself in some cases), a likelihood that the PSFCH transmission relates to a failed sidelink communication, and/or the like.

In some aspects, the UE may attempt to detect only PSFCH transmissions that include control information that the UE previously decoded. For example, the UE may decode control information in a PSCCH that indicates a control signal reserving a resource for a future retransmission and indicating a need for HARQ feedback to confirm whether retransmission is to be performed. In such cases, the UE may know a location to be monitored for the HARQ feedback. On the other hand, if the UE has not previously decoded the control information related to a particular PSFCH transmission, the UE may be unaware of the resource reserved for the future retransmission. Accordingly, in cases where the UE has previously decoded the control information related to a particular PSFCH transmission (e.g., a previous packet for which the PSFCH transmission is to include HARQ feedback), the UE may be able to determine a priority associated with a previous packet for which the transmission resource has been reserved. In some aspects, the UE may prioritize the PSFCH transmissions to be included in the subset of the PSFCH transmissions that are to be detected (e.g., according to a descending priority, where PSFCH transmissions having an unknown priority may be assigned a null priority, a negative priority, and/or the like).

Additionally, or alternatively, the UE may prioritize the PSFCH transmissions to be included in and/or excluded from the subset of the PSFCH transmissions that are to be detected based at least in part on a distance from the UE to one or more other UEs that are intended receivers of the PSFCH transmissions and have reserved a resource for a future retransmission. Additionally, or alternatively, the PSFCH transmissions may be prioritized based on an RSRP measurement associated with one or more previous packets in which the UE decoded the control information indicating the resource reserved for the future retransmission. For example, in some aspects, the UE may generally assign a higher priority to PSFCH transmissions that are intended to be received by other UEs that are relatively closer to the UE, associated with relatively higher RSRP measurements, and/or the like. In general, the higher priority may be assigned to these PSFCH transmissions because interference may be worse if an attempted transmission were to collide with retransmissions by other UEs that are close to the UE, transmitting at a high power level, and/or the like. For example, the attempted transmission may collide with the retransmission by another UE if both UEs attempt to transmit at the same RB location at the same time. In order to avoid such a collision, the UE may prioritize detecting PSFCH transmissions that are intended to be received by other UEs that are a smaller distance away from the UE, associated with a high RSRP measurement, and/or the like.

Additionally, or alternatively, the UE may prioritize the PSFCH transmissions to be included in and/or excluded from the subset of the PSFCH transmissions that are to be detected based at least in part on a likelihood of failure associated with a sidelink communication for which a PSFCH transmission includes HARQ feedback. For example, in addition to indicating the resource reserved to a future retransmission, previously decoded control information may indicate which sidelink communications may have collided with one another. Furthermore, the previously decoded control information may indicate whether the transmitter and receiver of such sidelink communications are far away from each other or located close to one another. Accordingly, based at least in part on the control information, the UE may be able to estimate a parameter representing a likelihood of a sidelink communication failing, which may therefore indicate a likelihood of a PSFCH transmission including HARQ (e.g., NACK) feedback. For example, in some aspects, the UE may infer that a PSFCH transmission is likely to be sent for a sidelink communication for which the estimated parameter representing the likelihood of failure satisfies a threshold value. In such cases, the UE may assume that the PSFCH transmissions are likely to be sent for such sidelink communications, and the UE may exclude such PSFCH transmissions from the subset to be monitored and instead devote computing resources (e.g., concurrent detection capabilities) to detecting other PSFCH transmissions. Additionally, or alternatively, in some aspects, the UE may include such PSFCH transmissions in the subset to be monitored to avoid a collision with a likely retransmission.

As shown in FIG. 8B, and by reference number 806, the UE may monitor the PSFCH for the subset of the PSFCH transmissions, which includes a quantity of PSFCH transmissions that satisfies the maximum concurrent detection capability of the UE. As further shown in FIG. 8B, and by reference number 808, the UE may refrain from attempting to detect other scheduled PSFCH transmissions that were not selected to be included in the subset to be monitored. Accordingly, as further shown in FIG. 8B, and by reference number 810, the UE may determine an availability of the resources that the other UE reserved for retransmission based at least in part on a status of the detected PSFCH transmissions, the undetected PSFCH transmissions, and/or the like.

For example, in some aspects, the UE may decode the detected PSFCH transmissions and determine whether the HARQ feedback carried therein includes a NACK, in which case the UE may determine that a reserved resource will be used for retransmission and is therefore unavailable to be used. Alternatively, if the HARQ feedback carried therein includes an ACK and/or the PSFCH transmission is not sent as scheduled, the UE may determine that a reserved resource will not be used for retransmission and is therefore available to be used. Furthermore, for the subset of the PSFCH transmissions that the UE refrains from attempting to detect, the UE may apply various rules to infer whether the PSFCH transmission is likely to be sent. In some aspects, when the UE infers that a particular PSFCH transmission is likely to be sent and/or is likely to include NACK feedback, the UE may determine that a reserved resource will be used for retransmission and is therefore unavailable to be used. Alternatively, when the UE infers that a particular PSFCH transmission is unlikely to be sent and/or is likely to include ACK feedback, the UE may determine that a reserved resource will not be used for retransmission and is therefore available to be used.

For example, in some aspects, the UE may generally assume that any PSFCH transmissions that the UE refrains from detecting are likely to be sent and/or are likely to include NACK feedback (e.g., to minimize a probability of a collision with a future retransmission). Additionally, or alternatively, in some aspects, the UE may determine a set of parameters associated with previous packet transmissions associated with the PSFCH transmissions that the UE refrains from detecting. For example, in some aspects, the set of parameters may include priorities associated with the previous packet transmissions, RSRP measurements associated with the previous packet transmissions, distances between the UE and intended receivers of such PSFCH transmissions, an original transmit power associated with the previous packet transmissions, and/or the like. In some aspects, the UE may infer that a particular PSFCH transmission is unlikely to be sent if the priority associated with a corresponding previous packet transmission fails to satisfy a threshold value, the RSRP measurement fails to satisfy a threshold value, the distance between the UE and the intended receiver of the PSFCH transmission satisfies a threshold value, an original transmission power for the previous packet transmission is unlikely to fail, and/or the like. Additionally, or alternatively, the UE may infer that a particular PSFCH transmission is likely to be sent if the priority associated with the corresponding previous packet transmission satisfies the threshold value, the RSRP measurement satisfies the threshold value, the distance between the UE and the intended receiver of the PSFCH transmission fails to satisfy the threshold value, the original transmission power for the previous packet transmission is likely to fail, and/or the like.

In this way, the UE may identify resources that have been reserved for retransmissions of sidelink communications and avoid using reserved resources that are likely to be used (e.g., based on a PSFCH transmission including NACK feedback). In this way, a likelihood of collisions (e.g., transmitting using the same RB location as a retransmission) may be reduced, which improves performance and reliability of the sidelink communications. Furthermore, in this way, the UE may utilize resources that have been reserved for retransmissions when such reserved resources are unlikely to be used by the reserving UE (e.g., based on a PSFCH transmission including ACK feedback, based on a non-transmission of a scheduled PSFCH transmission, and/ or the like). In this way, utilization of sidelink communication resources may be improved, latency may be reduced because a UE can transmit sooner using available reserved resources, and/or the like.

As indicated above, FIGS. 8A-8B are provided as an example. Other examples may differ from what is described with respect to FIG. 8A-8B.

Figure 9:
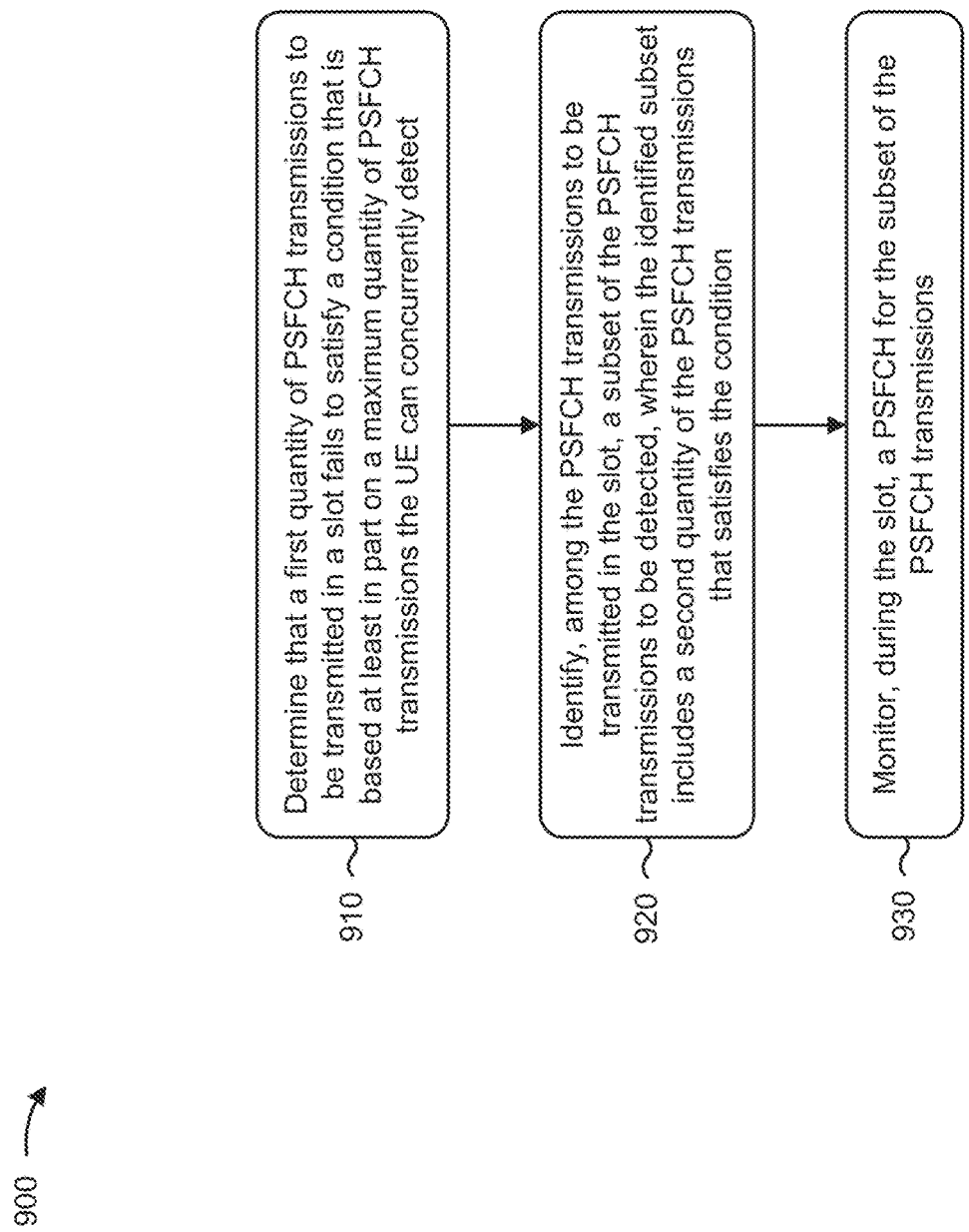
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120, UE 505, Tx/Rx UE 605, Rx/Tx UE 610, and/or the like) performs operations associated with concurrent PSFCH detection.

As shown in FIG. 9, in some aspects, process 900 may include determining that a first quantity of PSFCH transmissions to be transmitted in a slot fails to satisfy a condition that is based at least in part on a maximum quantity of PSFCH transmissions the UE can concurrently detect (block 910). For example, the UE (e.g., using controller/processor 280, memory 282, and/or the like) may determine that a first quantity of PSFCH transmissions to be transmitted in a slot fails to satisfy a condition that is based at least in part on a maximum quantity of PSFCH transmissions the UE can concurrently detect, as described above.

As further shown in FIG. 9, in some aspects, process 900 may include identifying, among the PSFCH transmissions to be transmitted in the slot, a subset of the PSFCH transmissions to be detected, wherein the identified subset includes a second quantity of the PSFCH transmissions that satisfies the condition (block 920). For example, the UE (e.g., using controller/processor 280, memory 282, and/or the like) may identify, among the PSFCH transmissions to be transmitted in the slot, a subset of the PSFCH transmissions to be detected, as described above. In some aspects, the identified subset includes a second quantity of the PSFCH transmissions that satisfies the condition.

As further shown in FIG. 9, in some aspects, process 900 may include monitoring, during the slot, a PSFCH for the subset of the PSFCH transmissions (block 930). For example, the UE (e.g., using antenna 252, DEMOD 254, MIMO detector 256, receive processor 258, controller/ processor 280, and/or the like) may monitor, during the slot, a PSFCH for the subset of the PSFCH transmissions, as described above.

Process 900 may include additional aspects, such as any single aspect or any combination of aspects described below and/or in connection with one or more other processes described elsewhere herein.

In a first aspect, the maximum quantity of PSFCH transmissions the UE can concurrently detect is based at least in part on a capability of the UE.

In a second aspect, alone or in combination with the first aspect, identifying the subset of the PSFCH transmissions to be detected includes identifying, among the PSFCH transmissions to be transmitted in the slot, one or more of the PSFCH transmissions related to HARQ feedback for a packet for which a resource has been reserved for retransmission, and identifying the subset of the PSFCH transmissions to be detected based at least in part on a priority associated with the packet for which the resource has been reserved.

In a third aspect, alone or in combination with one or more of the first and second aspects, the subset of the PSFCH transmissions to be detected is identified based at least in part on distances from the UE to respective receivers associated with each of the PSFCH transmissions to be transmitted in the slot.

In a fourth aspect, alone or in combination with one or more of the first through third aspects, the PSFCH transmissions to be transmitted in the slot include HARQ feedback for previous packet transmissions, and the subset of the PSFCH transmissions to be detected is identified based at least in part on respective reference signal received power measurements associated with the previous packet transmissions.

In a fifth aspect, alone or in combination with one or more of the first through fourth aspects, the PSFCH transmissions to be transmitted in the slot include HARQ feedback for previous packet transmissions, and the subset of the PSFCH transmissions to be detected is identified based at least in part on a parameter representing respective likelihoods of failure for the previous packet transmissions.

In a sixth aspect, alone or in combination with one or more of the first through fifth aspects, the subset of the PSFCH transmissions to be detected includes at least one of the PSFCH transmissions for which the parameter representing the respective likelihood of failure for a previous packet transmission satisfies a threshold value.

In a seventh aspect, alone or in combination with one or more of the first through sixth aspects, the subset of the PSFCH transmissions to be detected excludes at least one of the PSFCH transmissions for which the parameter representing the respective likelihood of failure for a previous packet transmission satisfies a threshold value.

In an eighth aspect, alone or in combination with one or more of the first through seventh aspects, process 900 further includes identifying, among the PSFCH transmissions to be transmitted in the slot, at least one PSFCH transmission that is not included in the subset of the PSFCH transmissions to be detected, and determining that a resource reserved by a receiver of the at least one PSFCH transmission is unavailable to use based at least in part on a set of parameters associated with a previous packet transmission for which the at least one PSFCH transmission includes HARQ feedback.

In a ninth aspect, alone or in combination with one or more of the first through eighth aspects, the set of parameters include at least one of a priority associated with the previous packet transmission, an RSRP associated with the previous packet transmission, a distance between the UE and a receiver of the at least one PSFCH transmission, or an original transmit power associated with the previous packet transmission.

In a tenth aspect, alone or in combination with one or more of the first through ninth aspects, process 900 further includes identifying, among the PSFCH transmissions to be transmitted in the slot, at least one PSFCH transmission that is not included in the subset of the PSFCH transmissions to be detected, and determining that a resource reserved by a receiver of the at least one PSFCH transmission is available to use based at least in part on a set of parameters associated with a previous packet transmission for which the at least one PSFCH transmission includes HARQ feedback.

In an eleventh aspect, alone or in combination with one or more of the first through tenth aspects, the set of parameters include at least one of a priority associated with the previous packet transmission, an RSRP associated with the previous packet transmission, a distance between the UE and a receiver of the at least one PSFCH transmission, or an original transmit power associated with the previous packet transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
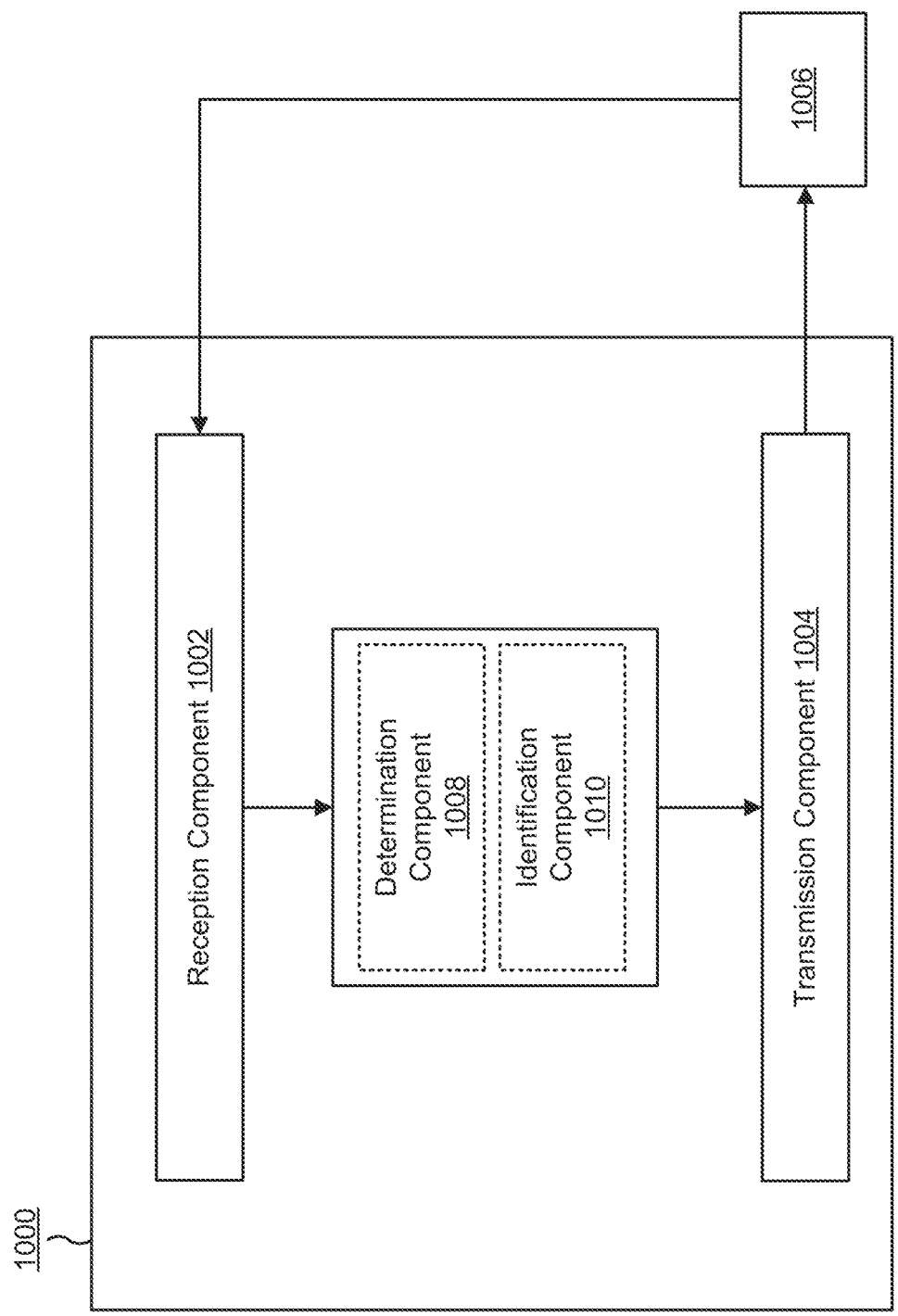
FIG. 10 is a block diagram of an example apparatus for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008 or an identification component 1010, among other examples.

In some aspects, the apparatus 1000 may be configured to perform one or more operations described herein in connection with FIGS. 8A-8B. Additionally or alternatively, the apparatus 1000 may be configured to perform one or more processes described herein, such as process 900 of FIG. 9. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The determination component 1008 may determine that a first quantity of PSFCH transmissions to be transmitted in a slot fails to satisfy a condition that is based at least in part on a maximum quantity of PSFCH transmissions the UE can concurrently detect. In some aspects, the determination component 1008 may include a controller/processor, a memory, or a combination thereof, of the UE described above in connection with FIG. 2. The identification component 1010 may identify, among the PSFCH transmissions to be transmitted in the slot, a subset of the PSFCH transmissions to be detected, wherein the identified subset includes a second quantity of the PSFCH transmissions that satisfies the condition. In some aspects, the identification component 1010 may include a controller/processor, a memory, or a combination thereof, of the UE described above in connection with FIG. 2. The reception component 1002 may monitor, during the slot, a PSFCH for the subset of the PSFCH transmissions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed at a user equipment (UE), comprising:
    determining that a first quantity of physical sidelink feedback channel (PSFCH) transmissions to be transmitted in a slot fails to satisfy a condition that is based at least in part on a maximum quantity of PSFCH transmissions that the UE can concurrently detect;
    identifying, among the PSFCH transmissions to be transmitted in the slot, a subset of the PSFCH transmissions to be detected,
        wherein the subset includes a second quantity of the PSFCH transmissions that satisfies the condition,
        wherein the PSFCH transmissions to be transmitted in the slot include hybrid automatic repeat request feedback for previous packet transmissions,
        wherein the subset is identified based at least in part on a parameter representing respective likelihoods of failure for the previous packet transmissions, and
        wherein the subset includes at least one PSFCH transmission scheduled by another UE; and
    monitoring, during the slot, a PSFCH for the subset.

2. The method of claim 1, wherein the maximum quantity of PSFCH transmissions that the UE can concurrently detect is based at least in part on a capability of the UE.

3. The method of claim 1, wherein identifying the subset includes:
    identifying, among the PSFCH transmissions to be transmitted in the slot, one or more of the PSFCH transmissions related to hybrid automatic repeat request feedback for a packet for which a resource has been reserved for retransmission; and
    identifying the subset based at least in part on a priority associated with the packet for which the resource has been reserved.

4. The method of claim 1, wherein the subset is identified based at least in part on distances from the UE to respective transmitters associated with each of the PSFCH transmissions to be transmitted in the slot.

5. The method of claim 1, wherein the subset is identified based at least in part on respective reference signal received power measurements associated with the previous packet transmissions.

6. The method of claim 1, wherein identifying the subset comprises:
    determining that at least one of the PSFCH transmissions for which the parameter representing the respective likelihood of failure for a previous packet transmission satisfies a threshold value; and
    identifying the at least one of the PSFCH transmissions as one PSFCH transmission of the subset of PSFCH transmissions in accordance with the determination.

7. The method of claim 1, wherein the subset excludes at least one of the PSFCH transmissions for which the parameter representing the respective likelihood of failure for a previous packet transmission satisfies a threshold value.

8. The method of claim 1, further comprising:
    identifying, among the PSFCH transmissions to be transmitted in the slot, at least one PSFCH transmission that is not included in the subset; and
    determining that a resource reserved by a transmitter of the at least one PSFCH transmission is unavailable to use based at least in part on a set of parameters associated with a previous packet transmission for which the at least one PSFCH transmission includes hybrid automatic repeat request feedback.

9. The method of claim 8, wherein the set of parameters include at least one of a priority associated with the previous packet transmission, a reference signal received power associated with the previous packet transmission, a distance between the UE and the transmitter of the at least one PSFCH transmission, or an original transmit power associated with the previous packet transmission.

10. The method of claim 1, further comprising:
    identifying, among the PSFCH transmissions to be transmitted in the slot, at least one PSFCH transmission that is not included in the subset; and
    determining that a resource reserved by a transmitter of the at least one PSFCH transmission is available to use based at least in part on a set of parameters associated with a previous packet transmission for which the at least one PSFCH transmission includes hybrid automatic repeat request feedback.

11. The method of claim 10, wherein the set of parameters include at least one of a priority associated with the previous packet transmission, a reference signal received power associated with the previous packet transmission, a distance between the UE and the transmitter of the at least one PSFCH transmission, or an original transmit power associated with the previous packet transmission.

12. The method of claim 1, further comprising:
    wherein the first quantity of PSFCH transmissions are to be transmitted by one or more other UEs based at least in part on one or more other transmissions previously transmitted by the UE or another UE.

13. An apparatus for wireless communication at a user equipment (UE), comprising:

a memory; and
one or more processors operatively coupled to the memory, the one or more processors configured to:
determine that a first quantity of physical sidelink feedback channel (PSFCH) transmissions to be transmitted in a slot fails to satisfy a condition that is based at least in part on a maximum quantity of PSFCH transmissions that the UE can concurrently detect;
identify, among the PSFCH transmissions in the slot, a subset of the PSFCH transmissions to be detected, wherein the subset includes a second quantity of the PSFCH transmissions that satisfies the condition, wherein the PSFCH transmissions to be transmitted in the slot include hybrid automatic repeat request feedback for previous packet transmissions, and wherein the subset is identified based at least in part on respective likelihoods of failure for the previous packet transmissions; and
monitor, during the slot, a PSFCH for the subset.

14. The UE of claim 13, wherein the maximum quantity of PSFCH transmissions that the UE can concurrently detect is based at least in part on a capability of the UE.

15. The UE of claim 13, wherein the one or more processors, when identifying the subset, are further configured to:
identify, among the PSFCH transmissions to be transmitted in the slot, one or more of the PSFCH transmissions related to hybrid automatic repeat request feedback for a packet for which a resource has been reserved for retransmission; and
identify the subset based at least in part on a priority associated with the packet for which the resource has been reserved.

16. The UE of claim 13, wherein the subset is identified based at least in part on distances from the UE to respective transmitters associated with each of the PSFCH transmissions to be transmitted in the slot.

17. The UE of claim 13, wherein the subset is identified based at least in part on respective reference signal received power measurements associated with the previous packet transmissions.

18. The UE of claim 13, wherein the subset includes at least one of the PSFCH transmissions for which a parameter representing a respective likelihood of failure for a previous packet transmission satisfies a threshold value.

19. The UE of claim 13, wherein the subset excludes at least one of the PSFCH transmissions for which a parameter representing a respective likelihood of failure for a previous packet transmission satisfies a threshold value.

20. The UE of claim 13, wherein the one or more processors are further configured to:
identify, among the PSFCH transmissions to be transmitted in the slot, at least one PSFCH transmission that is not included in the subset; and
determine that a resource reserved by a transmitter of the at least one PSFCH transmission is unavailable to use based at least in part on a set of parameters associated with a previous packet transmission for which the at least one PSFCH transmission includes hybrid automatic repeat request feedback.

21. The UE of claim 20, wherein the set of parameters include at least one of a priority associated with the previous packet transmission, a reference signal received power associated with the previous packet transmission, a distance between the UE and the transmitter of the at least one PSFCH transmission, or an original transmit power associated with the previous packet transmission.

22. The UE of claim 13, wherein the one or more processors are further configured to:
identify, among the PSFCH transmissions to be transmitted in the slot, at least one PSFCH transmission that is not included in the subset; and
determine that a resource reserved by a transmitter of the at least one PSFCH transmission is available to use based at least in part on a set of parameters associated with a previous packet transmission for which the at least one PSFCH transmission includes hybrid automatic repeat request feedback.

23. The UE of claim 13, wherein the subset includes at least one PSFCH transmission scheduled by another UE.

24. The UE of claim 22, wherein the set of parameters include at least one of a priority associated with the previous packet transmission, a reference signal received power associated with the previous packet transmission, a distance between the UE and the transmitter of the at least one PSFCH transmission, or an original transmit power associated with the previous packet transmission.

25. A non-transitory computer-readable medium storing a set of instructions for wireless communication, the set of instructions comprising:
one or more instructions that, when executed by at a user equipment (UE), cause the UE to:
determine that a first quantity of physical sidelink feedback channel (PSFCH) transmissions to be transmitted in a slot fails to satisfy a condition that is based at least in part on a maximum quantity of PSFCH transmissions that the UE can concurrently detect;
identify, among the PSFCH transmissions in the slot, a subset of the PSFCH transmissions to be detected, wherein the subset includes a second quantity of the PSFCH transmissions that satisfies the condition, wherein the PSFCH transmissions to be transmitted in the slot include hybrid automatic repeat request feedback for previous packet transmissions, and wherein the subset is identified based at least in part on a parameter representing respective likelihoods of failure for the previous packet transmissions; and
monitor, during the slot, a PSFCH for the subset.

26. The non-transitory computer-readable medium of claim 25, wherein the one or more instructions that cause the one or more processors to identify the subset further cause the one or more processors to:
identify, among the PSFCH transmissions to be transmitted in the slot, one or more of the PSFCH transmissions related to hybrid automatic repeat request feedback for a packet for which a resource has been reserved for retransmission; and
identify the subset based at least in part on a priority associated with the packet for which the resource has been reserved.

27. The non-transitory computer-readable medium of claim 25, wherein the subset detected is identified based at least in part on one or more of:
distances from the UE to respective receivers associated with each of the PSFCH transmissions to be transmitted in the slot, or
respective reference signal received power measurements associated with the previous packet transmissions.

28. The non-transitory computer-readable medium of claim 25, wherein the subset includes at least one PSFCH transmission scheduled by another UE.

29. An apparatus for wireless communication, comprising:
- means for determining that a first quantity of physical sidelink feedback channel (PSFCH) transmissions to be transmitted in a slot fails to satisfy a condition that is based at least in part on a maximum quantity of PSFCH transmissions that the apparatus can concurrently detect;
- means for identifying, among the PSFCH transmissions to be transmitted in the slot, a subset of the PSFCH transmissions to be detected,
  - wherein the subset includes a second quantity of the PSFCH transmissions that satisfies the condition,
  - wherein the PSFCH transmissions to be transmitted in the slot include hybrid automatic repeat request feedback for previous packet transmissions, and
  - wherein the subset is identified based at least in part on a parameter representing respective likelihoods of failure for the previous packet transmissions; and
- means for monitoring, during the slot, a PSFCH for the subset.

30. The apparatus of claim 29, wherein the means for identifying the subset includes:
- means for identifying, among the PSFCH transmissions to be transmitted to the apparatus in the slot, one or more of the PSFCH transmissions related to hybrid automatic repeat request feedback for a packet for which a resource has been reserved for retransmission; and
- means for identifying the subset based at least in part on a priority associated with the packet for which the resource has been reserved.

* * * * *